(12) United States Patent
Ortiz Obando

(10) Patent No.: US 11,137,749 B2
(45) Date of Patent: Oct. 5, 2021

(54) METHOD FOR HARMONISING COLOUR IN MANUFACTURED ITEMS

(71) Applicant: COLOR HARMONY EXPERTS, S.C., Nuevo León (MX)

(72) Inventor: Eloisa María Ortiz Obando, Nuevo Leon (MX)

( * ) Notice: Subject to any disclaimer, the term of this patent is extended or adjusted under 35 U.S.C. 154(b) by 0 days.

(21) Appl. No.: 16/729,413

(22) Filed: Dec. 29, 2019

(65) Prior Publication Data

US 2020/0249662 A1    Aug. 6, 2020

Related U.S. Application Data

(63) Continuation-in-part of application No. 15/557,818, filed on Sep. 13, 2017, now Pat. No. 10,540,727.

(51) Int. Cl.
*G05B 19/418* (2006.01)

(52) U.S. Cl.
CPC . *G05B 19/41875* (2013.01); *G05B 19/41865* (2013.01); *G05B 2219/31376* (2013.01); *G05B 2219/32368* (2013.01); *G05B 2219/42337* (2013.01)

(58) Field of Classification Search
None
See application file for complete search history.

(56) References Cited

U.S. PATENT DOCUMENTS

| 6,141,598 A * | 10/2000 | Nam | G06Q 10/0633 700/95 |
| 2003/0035126 A1 * | 2/2003 | Stone | H04N 1/603 358/1.9 |
| 2006/0190110 A1 * | 8/2006 | Holt | G06Q 10/087 700/96 |
| 2007/0038422 A1 * | 2/2007 | Wang | G06Q 10/06 703/8 |
| 2009/0021524 A1 * | 1/2009 | Lenart-Weary | G01J 3/528 345/593 |
| 2012/0254141 A1 | 10/2012 | Poland et al. | |
| 2015/0109443 A1 * | 4/2015 | Nichols | G06T 7/001 348/148 |
| 2016/0140734 A1 * | 5/2016 | Kato | G06K 9/6201 348/222.1 |

FOREIGN PATENT DOCUMENTS

| ES | 2331196 T3 | 12/2009 |
| ES | 2411280 A1 | 7/2013 |

OTHER PUBLICATIONS

ISR: Spanish Patent Office; Nov. 26, 2015.

* cited by examiner

*Primary Examiner* — Ryan A Jarrett
(74) *Attorney, Agent, or Firm* — Patshegen IP LLC; Moshe Pinchas

(57) ABSTRACT

The invention relates to a method for the harmonization of color in manufactured items, which allows color tolerances to be established based on pre-defined values and visual observations for the different parts that form the item and the operating conditions for the manufacture of said parts by which means the colors falling within said tolerances can be obtained as well as the acceptance of the color harmonization of the final product by means of the use of algorithms and visual examination by a person or a machine.

2 Claims, 6 Drawing Sheets

METHOD FOR HARMONISING COLOUR IN MANUFACTURED ITEMS

BACKGROUND OF THE INVENTION

A. Field of the Invention

This invention relates to methods for achieving color harmonization among parts that form manufactured products, such as automobiles and more particularly, with an automated method for color harmonization of manufactured articles which manages to establish numerical-visual color tolerances for the different parts that make up the article and that ensure the visual approval of the end customer, operating conditions for the manufacture of said parts through which colors are obtained that fall within said tolerances, and the acceptance of the finished product's color harmonization by using algorithms and visual examination by a person or machine.

B. Description of the Related Art

In the last few decades, a noticeable trend has been observed on behalf of the consumer to make the decision to buy a product based on what he/she perceives from his/her five senses, thus controlling and monitoring the final appearance of products in the market, especially with regards to the color of products, has become significantly important; hence why the manufacturing industry has been forced to produce a greater variety of its products in less time, reducing the product life cycle.

Currently, in industries where color approval by the final assembler is required, it is important to have a system that manages the color processes in order to perform them quickly and efficiently.

Among the existing technologies currently used as tools to monitor a part's color are the spectrophotometer, colorimeter and gonio-spectrophotometer, which have the capacity to measure color at a particular point of the production process, comparing it with a given color standard, but these devices have two inconvenients: first and foremost, they give disparate measurements for a visual examination due to not taking into consideration and controlling texture variations and base substrate; unlike this invention, which can indicate the points modified in order to manage color in a manufacturing process and obtain the desired color.

In said manufacturing processes, new customer orders for different products, pieces or parts are continually generated, which are requested in a certain color as final appearance and for said purpose, the orders can be accompanied by a physical part called "master", which is a plate of various substrates or controlled pattern, with the visual appearance desired by the client. Otherwise, the client may provide a numerical or nominative specification referring to industry standard and established patterns, such as the Pantone, but ultimately, it is about obtaining a visual validation of what the client wants.

Once the order is issued, the common practice is to generate a new part number for each different part to be manufactured. For each part, one or more colors can be requested and each color may or may not generate a different part number according to the common practices of the various industries.

For instance, the normal practice currently followed by automobile assemblers to obtain the acceptance of a color specification for an automobile is by means of several color tests, the optimization of manufacturing processes for each part based on staff experience, trial and error, and an exhausting interdepartmental organizational effort. As a result of these empirical processes, labor and machinery costs due to multiple tuning up operations, delays on delivery times, non-programmed costs and unsatisfied customers—who can even detect parts in the same automobile whose colors do not properly match up—, are generated.

In order to partly resolve the aforementioned issues, Poland's patent application publication No. 2012/0254141 describes a computerized system and method to analyze the color consistency in automobile parts and provide feedback on the painting processes produced at an assembly plant. The system and method facilitates the gathering of data and analysis of numerous points during the assembly and painting processes in order to identify possible adjustments so that the parts are painted with a specific tolerance, and it identifies which parts should be assembled with what others so as to ensure color harmony. During an inspection process, the body and bumper are measured, and the measurements and colorimetric data are stored together with an identifier for the part of the body or bumper. Measurements related with the equipment and paint mixture variables are also stored, as well as environmental variables that influence the results of the paint. A software application facilitates data analysis and the availability of troubleshooting manuals, which aid in issue resolution of color discrepancies is mentioned, describing some of them. Since color tendencies drift apart from a concrete standard, changes are made to the painting process, including operation conditions, before painting the parts so as to prevent color inconsistencies.

The Poland method and system adjusts the painting and manufacturing parameters when these fall out of those predefined, but it is well-known in the industry that although the color parameters fall out of those predefined, said color parameters may be accepted by the customer, since upon visually examining the part, it may seem adequate to the eyes of an expert, hence with the Poland method and system, parts accepted after a visual examination by the client may be rejected by the system since they fall out of the predefined parameters, given that the Poland system and method does not take into account the visual examination of the parts. Likewise, the Poland method does not define the iterative generation of any type of tolerances or of the final part, nor of process conditions.

It would be desirable to have a method which takes into account visual examinations of color and that could adjust parts' color and manufacturing parameters in accordance with parts accepted after performing a visual examination and even when these are outside the original color parameters.

In view of the above described need, the applicant developed an automated method for color harmonization in manufactured articles, which allows establishing color tolerances based on an initial visual pattern and on visual observations for the various parts which make up the article and the operating conditions for manufacture of said parts, all by means of the use of algorithms and visual examination by an individual or machine, through which colors are obtained that ensure client's visual acceptance with regards to an initial pattern and acceptance of the finished product's color harmonization, connecting the various suppliers and giving visibility over the adjustment relative to the visual-numerical tolerances that have been already previously obtained thanks to a visual entry.

The applicant's method allows having total control, detecting and managing the color variations by the client and supplier, in addition to improving the definition of color tolerance. Moreover, the method allows indicating and controlling the process variables based on said variations in the color tolerances.

SUMMARY OF THE INVENTION

It is therefore a main objective of this invention to provide an automated method for color harmonization in manufactured articles which allows establishing color tolerances based on predefined values and visual observations for the various parts that make up the article and the operating conditions of manufacture for said parts through which it is possible to obtain colors that fall within said tolerances and the acceptance of the finished product's color harmonization by means of the use of algorithms and visual examination from a person or machine.

Another main objective of this invention is to provide an automated method for color harmonization in manufactured articles of the above described nature, which allows having total control, detecting and managing the color variations detected by the client and supplier, in addition to improving the definition of the color tolerance.

Furthermore, the method allows indicating and controlling the process variables based on said variations in the color tolerances.

These and other objectives and advantages of this invention will become apparent to those with routine knowledge of the industry from the following detailed description of the invention.

DETAILED DESCRIPTION OF THE INVENTION

Figure 1:
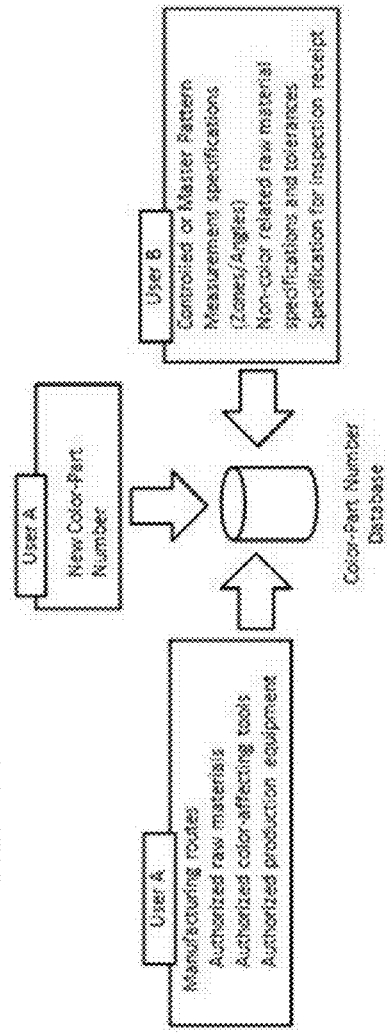
FIG. 1 shows a diagram of an embodiment of elements of information that form the part-color number's registry.

The automated method for color harmonization in manufactured articles of this invention will now be described by referencing the preferred embodiments of the invention.

In a preferred embodiment, the automated method of this invention is applied together with a manufacturing system of vehicles with a finishing color, which may have different presentations, such as a parts injection process, which generates products where the resin already has a color and therefore, the parts produced are obtained with a final color or a process for painting parts, in which the parts are already formed by various substrates such as metal or plastic, and a layer of paint is applied giving the part's final color and appearance, among others.

In the context of this description, part refers to a plurality of similar pieces produced according to a model or "part".

In said vehicle manufacturing processes, new customer orders for different products or parts are continually generated, which are requested with a particular color as final appearance and for said effect, the orders may be accompanied by a physical piece called a "master", which is a plate of various substrates or controlled pattern with the visual appearance desired by the client. Otherwise, the client may provide a numerical or nominative specification, referring to industry standard and established patterns, such as the Pantone, but ultimately, it is about obtaining a visual validation of what the client wants.

Once the order has been generated, the common practice is to generate a new part number for each different part that has to be manufactured. For each part, one or more finishing colors can be requested, and each color may or may not generate—in the common practices of the various industries—a different part number.

The method of the present invention comprises an automated method in which the different steps comprising the method are run by a computer.

The automated method of this invention comprises two main stages: the generation of tolerances and the color harmonization of parts.

The first stage of tolerance generation comprises:

1a) automatically generating a "color-part number" for each vehicle's part to be manufactured.

The color-part number is a unique and distinctive alphanumeric identification not just of the part given its geometry and performance specifications, but also due to the finishing color, meaning that although it is the same part and color is the only change, said identification shall consider them as different elements that will be analyzed independently.

In this step, the computer receives a plurality of data fields corresponding to the parts to be manufactured; assigns an identification number to a correspondent data field.

1b) registering the part-color number for each part in a computer database.

1c) automatically requesting information about the color-affecting production elements (processing and manufacturing equipment, and tools) for the color-part number.

In this stage the computer request information about those manufacturing elements whose change may imply considerable changes to the color end result of the manufacturing process and that must be taken into consideration for its control. For instance, these production elements may include the injection mold for the injection processes, the extrusion die and the roller for the extrusion processes, etc.

Figure 2:
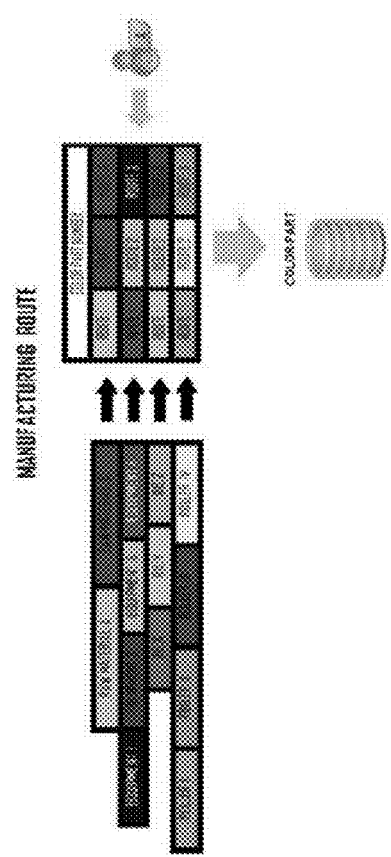
FIG. 2 shows a diagram of an embodiment for an approved manufacturing route.

1d) automatically generating the approved manufacturing route.

this stage the computer generates the sequence or combination of color-affecting process and manufacturing equipment, and tools for the part, and that will be used for manufacturing the various parts. Due to the nature of the manufacturing processes, the most common thing is for there to be different equipment for part manufacturing according to the volumes as well as the number of different products required by the clients. Thus, a manufacturing plant can have—using an extrusion process as example—four or five pieces of extrusion equipment, as well as four dies with the same geometric characteristics and three rollers with the same specification. In accordance with the foregoing, an approved manufacturing route for a color-part number could be: for instance, for extrusion equipment "X", the use of extrusion die "X" with roller "X" (without the "X" references referring to parts indicated in some figure) is authorized. FIG. 2 shows a diagram for the embodiment of an approved manufacturing route. Input: for each part, a list of manufacturing elements and processes. In this step, for each vehicle part, the computer orders the list of manufacturing elements and processes in accordance with its "sequence field". Output: an ordered list of manufacturing elements and processes related to each product.

1e) automatically requesting information about the critical variables for the process and manufacturing equipment and tools that are part of the approved manufacturing route.

In this stage the computer requests the critical variables for the process and manufacturing equipment and tools, such as, the production and operation conditions of the production equipment, whose variation has an impact on the final color obtained that will be approved by the client, i.e. variables (such as operation conditions) that affect the final color of the manufactured part. For instance, said variables may include the pressure exerted by roller "X", temperature, etc.

1f) automatically requesting information about the raw material used in the approved manufacturing route for the manufacturing of each color-part number and its origin, and automatically adding said information to the approved manufacturing route in the database.

This stage consists in adding additional information regarding the origin of the various raw materials used for manufacturing each color-part number, where origin refers to knowing which supplier (or group of suppliers, in the case of parts manufactured with a combination of two or more raw materials) will be who provides the raw material in that "manufacturing route". A change of supplier, even when the rest of the conditions are kept the same, means the creation of a different manufacturing route. Thus, the so-called approved manufacturing routes consist of the specific manufacturing equipment, the set of color-affecting tools, as well as the raw material used.

1g) automatically requesting information about the controlled pattern or color "master" as well as the color measurement specifications for each color-part number.

Figure 4:
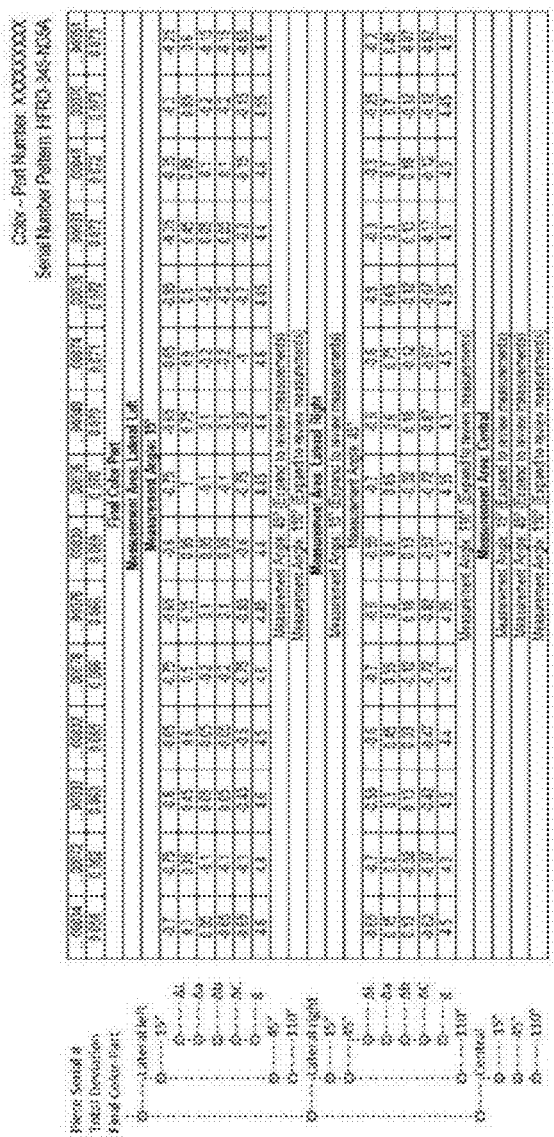
FIG. 4 shows an example of a format for a color measurement report of a part-color number.

In this stage, the computer requests information about the plate or nominative reference based on a controlled catalog of the visual appearance of color desired by the client on the product, as well as the client's measurement specifications, specifically the zones of the part that require measurement (also called "areas of measurement") and the measurement angles in each of these zones (e.g., in a front fascia, it is usually required for the color to be measured in the front part compared with the automobile's hood, and on the sides compared with its mudguards, and for each zone, verification is required at 15°, 45° and 110°). FIG. 4 shows an example of a color measurement report format for a color-part number.

1h) automatically requesting information about the specification or tolerances for aspects of the raw materials in non-color related aspects.

In this stage, the computer requests tolerances for aspects of raw materials, e.g., for the paint: ranges of viscosity, covering power, etc.

1i) for each part produced, automatically generating the production history or "part's DNA"

For each part produced, this stage comprises automatically generating a list of all the elements that converged in that specific part's manufacture. The "DNA" comprises a data log including information about which raw material was applied to the part, from what lot and container the former comes from; it is identified which staff was responsible for the transfer, supervision and operation, as well as what was the value of the various process conditions in the approved manufacturing route for the specific part, and the times at which each part was at each of the specific stages of the approved manufacturing route.

There are two viable alternatives for generating the parts' "DNA"; by automatically generating an identification number either prior to or after the manufacturing process.

Systematically, the most direct approach comprises automatically generating the identification number prior to the manufacturing process so that as it takes place, the operating conditions, as well as the raw material applied at that moment, are automatically registered into the corresponding part's "DNA" in the database.

Figure 3:
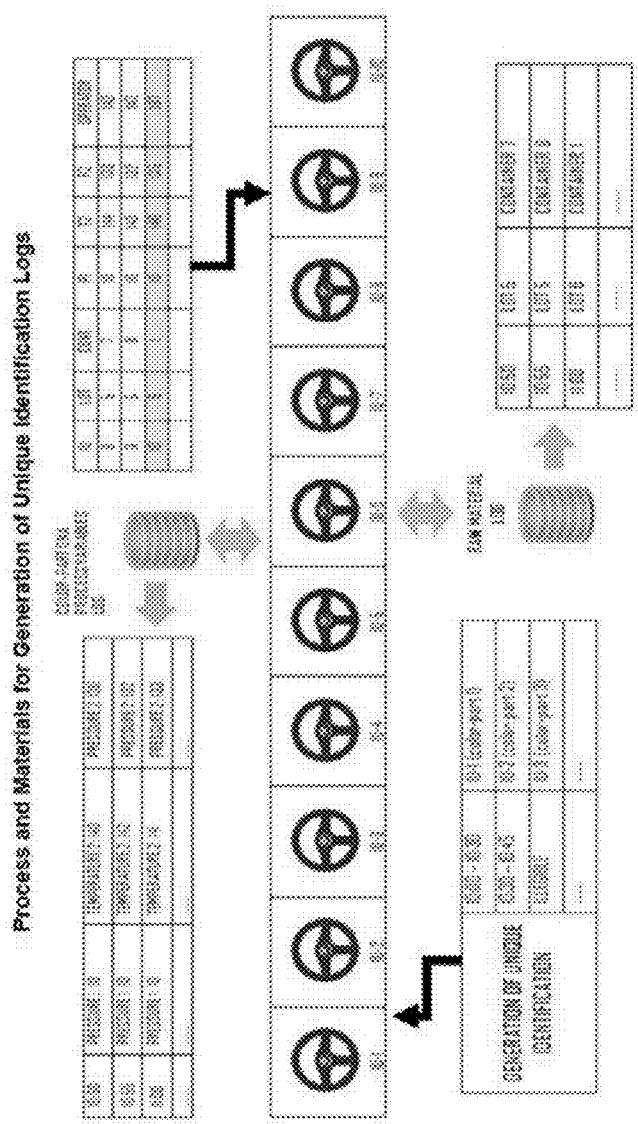
FIG. 3 shows an embodiment for the "Process Variable Log" and "Raw Material Log".

The second alternative is more in accordance with the reality of manufacturing processes, given that a serial number cannot be assigned to a part that has not yet been injected. Similarly, assigning a part number to a piece that is going to be completely painted is complex, given the difficulty of identification following the color coating application. For the implementation of this functionality, the so-called "Process Variables Log" and "Raw Material Log" records have been implemented. An example of said logs is shown in FIG. 3. In said logs, the operating conditions at each moment of the approved manufacturing route are continually detected and automatically registered, such that if the temperature in an oven is 95° C. at 10:05:13 am, said value is automatically recorded in the "Process Variables Log" by the computer and this is done with a predetermined frequency at the moment of registering the various manufacturing equipment at the plant. Similarly, a control of raw material is kept so as to manage traceability and integration of the produced part's "DNA". This process is described in point 1j). For instance, the computer identifies that at 04:32:53 pm, the application of primer from container 22, Lot 17 with raw material part number XYA134 was started. At each moment that a change of application from a different container, lot or raw material in any of the processes is generated, this change is automatically recorded in the "Raw Material Log" database.

Once both records are on the Log, when automatically generating the identification number for the part subsequent to the manufacturing process, the times when each part was at each stage of the approved manufacturing route at the moment of manufacturing are recorded (for instance, in the case of two-layer painting, there is the primer application process, drying process, gloss application process and drying process) and a conjugation of the discussed Logs is done so as to produce the data log that comprises the parts's DNA.

In addition to the aforementioned raw material and process information, as an element of the parts' DNA, information regarding the color is also requested and added by the computer, which de facto and due to requiring the examination of the final manufactured part, is assigned once the part has been assigned its unique identification number. This color information consists on: a numerical examination performed using technological equipment, such as an spectrophotometer or other, which under equal conditions of texture, substrate and others gives repeatable numerical readings in a standardized measurement system such as CIELAB, which consists of light/dark (L), red/green (a) and yellow/blue (b) readings, or CIELCH, which consists in light/dark (L), chromaticity (C) and tone (h); as well as, on a visual examination, which is performed by a previously determined capable person or machine, and which assigns values in the same standardized measurement system, but this is done taking into account the controlled pattern or "master" that the user B indicated for this specific color-part, giving values relative to −3, −2, −1, 0, 1, 2, 3, depending on the sense of the deviation. This preferred embodiment defines the −3 value as a variation outside visual comparative tolerance with regards to the controlled pattern in one of the axis, in the negative sense (dark for L, green for a, blue for b); −2 as an acceptable maximum variation; −1 as a slight variation and 0 as an exact adjustment; the negative values giving the same level of variation but in the opposite sense of the axis (light for L, red for a, yellow for b), thus an examination outside of tolerance means that the part is rejected.

FIG. 1 shows a diagram of an embodiment for information elements that form the registry for the part-color number.

1j) automatically adding to the database registry information about the lot and container of the raw material used or applied in the manufacturing process of the part's color to its DNA, thus automatically running a traceability method which registers as of entry of the raw material into the warehouse up to its entry into the manufacturing equipment, according to the approved manufacturing route, with the added purpose of implementing a process of First-In, First-Out (FIFO) process, where the traceability method comprises the following stages of:

- 1 ja) upon reception, automatically validating that the supplier information of the raw material (part) which must be provided to the computer corresponds to the supplier previously registered for an approved manufacturing route of the part-color numbers that use said raw material. In case the supplier does not correspond with that previously registered, said raw material will not be allowed into the warehouse and a new "manufacturing route" will be automatically generated prior to its entry;
- 1 jb) automatically requesting color information that is found in the quality documents of the color raw material;
- 1 jc) automatically validating that the color information registered in the previous stage is within numerical-visual tolerances for color raw material variables (variables in a standardized format such as CIELAB or other) generated in a subsequent stage by means of artificial intelligence (AI) algorithms. In case the color information is outside tolerances, the computer automatically generates a raw material rejecting message. The tolerances are a maximum and a minimum. For instance, if the maximum is 3.5 and the minimum is 1.8, and the value received is 2.7, then the color information is accepted. In turn, if it is 3.7; it is rejected. When performing the method of this invention for the first time, there is no tolerance information, hence, in said case, the raw material will never be rejected.
- 1jd) automatically registering lot number as well as the container numbers received in that shipment. This will help to implement a FIFO process that the manufacturing company of each part will follow, where the first raw material to enter is the one processed;
- 1je) automatically validating that the shipments are complete and that there are no missing items or errors by comparing information of the shipment with actual information of the parts in the shipment which must be previously provided to the computer;
- 1jf) requesting information about daily production orders for each part to manufacture, which indicate the requirements of materials;
- 1jg) forcing the use of a FIFO process, by automatically requesting information about the materials leaving a warehouse and validating that the materials leaving the warehouse are the oldest from a container level and not just lot level, and if the validation fails, generating an alarm. Likewise, the use of the authorized manufacturing routes is obliged, since even if the production order indicates the use of a combination of color-affecting equipment and tools, the computer validates that the correct material is used in the previously authorized manufacturing routes and for which process and raw material tolerances have already been defined. This is achieved by comparing the information of the product with the information about the materials to be used in the authorized manufacturing routes and producing an alarm if the comparison fails;
- 1jh) requesting information about the raw material entering into the first piece or group of manufacturing equipment and registering said information in the database, which will be used for generating the Raw Material Log previously described, and subsequently added to the "DNA" of the parts produced, and registering the lot number and container number of the raw material used or applied in the production or manufacturing process of the part's color.
- 1k) automatically requesting numerical-visual color tolerances for each part.

The numerical-visual color tolerances may be obtained by means of the computer running AI algorithms with an iterative learning process, and based on the numerical and visual color examinations of the parts produced, visual-numerical tolerances are determined, which owe their name to being numerical given that they can be entered into technological equipment such as the spectrophotometer and ensure obtaining visual measurements within −2 and +2 by the client when compared to the controlled pattern or "master", i.e., they ensure visual acceptance (in the case of this preferred embodiment, in which −3 and +3 were established in 1i) as a visual measurement scale). Furthermore, the numerical tolerances provided to the computer must be specified to the suppliers of raw materials, ensuring that when applied to the approved manufacturing route, give as a result the final visual authorization for the parts produced with a color within the visual-numerical tolerances.

1l) automatically requesting the tolerances for the critical process variables defined in 1e) of the approved manufacturing route and the correlations between the process conditions and the final color result, which may be obtained by the computer running AI algorithms with an iterative learning process, such as to identify which color variables (variables in a standardized format such as CIELAB or other) in each color-part number are controllable by means of changes to the process conditions, so that the necessary corrective actions can be taken when finding deviations in the color readings of the final parts.

1m) of the parts produced in accordance with the numerical-visual tolerances obtained in stage 1k) and the tolerances for the critical process variables obtained in stage 1l), automatically selecting the parts which best resemble the controlled pattern or master, as well as those close to the theoretical limit of the client's visual acceptance by using numerical-visual translation derived from the algorithms described in 1j). (See FIG. 5). In this step the computer automatically selects the information related to the parts which best resemble the controlled pattern or master, as well as those close to the theoretical limit of the client's visual acceptance and registers the information in a database corresponding to "parts which best resemble the controlled pattern or master, as well as those close to the theoretical limit of the client's visual acceptance". Optionally, such information may be requested by the computer and provided by a user 1n) automatically performing a visual examination of the parts identified in the previous stage (part-color numbers) and provide a numerical evaluation in a standardized format which is automatically converted to a numerical color specification based on a custom pre-programmed standardized criteria based on the perception of the client who will accept the parts, which comprises an ideal numerical color specification in accordance with a predefined numerical pattern that represents the physical color that must be perceived by a person in order to obtain approval by such person, wherein the visual examination is performed by means of a colorimeter or other computer vision system;

1o) automatically comparing the numerical color specification obtained in step 1n) corresponding to a part-color number with the predefined numerical pattern, and providing a numerical evaluation of color deviation resulting from the comparison (which are translated into the same −3 to 3 scale) and assigning the corresponding part-color number an approved status if the color deviation is within a predetermined pre-programmed numerical range;

1p) automatically adjusting the numerical-visual color tolerances in the database for the corresponding part-color number in accordance with the numerical evaluation in a standardized format corresponding to the part-color number approved in stage 1o) which may be done by means of AI algorithms with an iterative learning process, thereby adjusting the numerical-visual tolerances, considering the visual criteria of the client who will accept the parts;

1p) automatically adjusting the tolerances of the approved manufacturing route and the correlations between the process conditions and the color end result in accordance with the numerical evaluation in a standardized format corresponding to the part-color number approved in stage 1o) and in addition, accordingly adjust the numerical color tolerances that must be specified to the suppliers of raw material ensuring that applied to the approved manufacturing route result in the supplier's final authorization of the parts (part color-numbers.

If for any reason, any raw material specification is changed, such as its supplier—even when the new supplier ensures the same conditions as the former product—, a new manufacturing route will be generated, causing manufacturing to be blocked until a history is created which allows generating the information that allows indicating the tolerances for the different variables that ensure client's final visual approval.

This stage also includes monitoring the process conditions of the approved manufacturing routes and generating alarms whenever any of the process conditions fall outside the tolerance defined by the AI algorithms previously described, in order to take corrective actions to rectify the deviation, such as reducing the temperature of a process.

When production chooses to change any color-affecting equipment or tool, the method comprises blocking said change given that a new manufacturing route will be created which has not been authorized or rather, the creation of the history from zero will be required, allowing the creation of new process, color and raw material tolerances that ensure the part's final color.

To exemplify this situation, if a color-part number is being produced in equipment "X" with extrusion die "X" and roller "X", the system will return, resulting from the analysis of previous information, the process tolerances and other variables that ensure obtaining the final color that the client will approve. If roller "X" is changed for roller "Y", the tolerances have to be reevaluated in order to be certain of the client's final approval, given that said change implies potential changes to the various production conditions. The same applies if the same set of color-affecting tools are maintained, i.e., the extrusion die "X" and roller "X", but there is a change in equipment to extrusion equipment "Y". In said case, a new manufacturing route will be created, reason why the change must be blocked or notified so that prior to production, the history is created that allows defining new tolerances for the process variables that ensure the client's visual approval.

Figure 5:
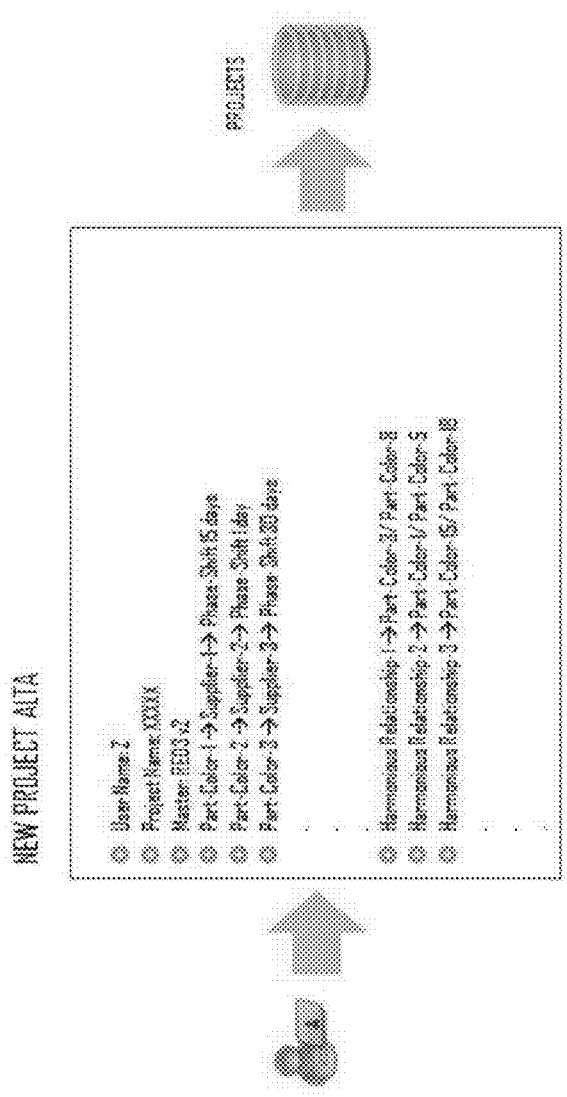
FIG. 5 shows an example of a report format where a project embodiment is shown.

The second stage comprises the color harmonization of parts and its objective is to achieve harmonization of the different parts from the suppliers that are integrated into a finished product, whether a vehicle, an electrical household appliance or others. For this type of integrated finished products, there is the complexity that even if the correct parameters were ideally defined for each one of the parts so as to be visually observed as having no significant variation with regards to an initially controlled pattern, if a part is within a visual evaluation value of −2 (e.g., maximum green) and an adjacent part is within a visual examination value of +2 (e.g., maximum red), when integrating them in a vehicle, if they are physically adjacent, a significant relative difference will be observed, which although was acceptable with regards to the master, when coming together in a vehicle, create disparity and visual discrepancy, which is not acceptable by the client. The part's color harmonization stage comprises the following steps of:

2a) for each product to be assembled, whose parts require to be observed in visual harmony, registering assembly project or "project" information, including but not limited to the following information: project code, information of the article to be assembled—including but not limited to article number, article description-, information on each part it is made up of—including but not limited to color-part number, color of the color-part number, part description- and color of the assembled product. All suppliers who have parts or supplies that make up the product and require being in visual harmony with each other will "subscribe" to this project. FIG. 5 shows an example of a report format which shows a project embodiment.

Figure 6:
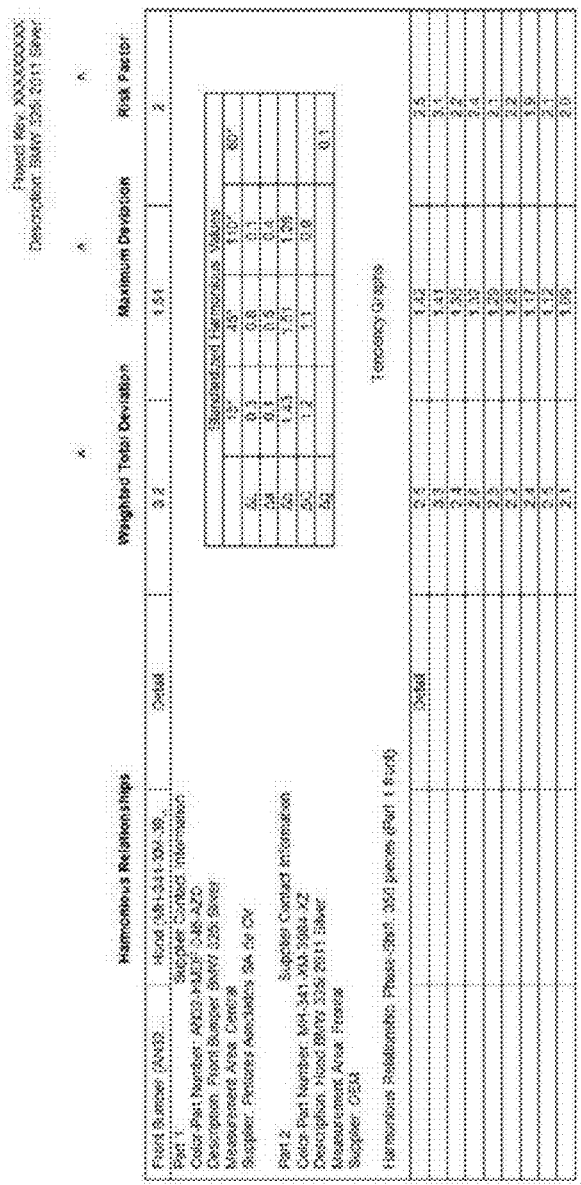
FIG. 6 shows an example of a report format where the characteristics of a harmonious relationship are shown.

2b) generating "harmonious relationships", which includes generating information that defines the interrelationship of two or more color-part numbers, which due to the need for the client's final acceptance, must be in visual harmony with each other, a situation usually related with the physical closeness or proximity in the assembled and finished product. When generating these harmonious relationships, it is determined which color-part number is related to which other, which measurement area of each color-part number must relate with which measurement area of the rest of the parts that make up the harmonious relationship, and finally which supplier provides each part. FIG. 6 shows an example of a report format where the characteristics of a harmonious relationship are shown;

2c) registering all the harmonious relationships for each project and registering the information of each supplier (such as name, code and contact information) for each part, establishing the harmonious relationships each supplier participates in;

2d) establishing a numerical phase-shift indicator for each harmonious relationship, whose objective is to identify which parts will be assembled together by the final assembler in accordance with the sequence in which they are received by the manufacturer following a FIFO system, under the understanding that the parts a manufacturer A produces today, can hardly be expected to be assembled together with the parts a manufacturer B produces today, due to different shipping times, inventory levels, etc. This phase-shift indicator is specified for each harmonious relationship and can be obtained in different ways: calculating the number of parts en route and in inventory for each one of the parts that make up the harmonious relationship at the moment of an assembly, and calculating the difference between the two numbers; identifying when production is started and by conservation of mass maintaining the relationship in the future; or rather by determining what parts are being assembled in a particular moment given as calculation and confirmation of the phase-shift indicator. In the case of parts used in various assembly projects, it is indicated to the harmonious relationships which ranges of unique identification numbers are related with a project and which to another, a common practice of the industries where it is involved.

2e) for each part that makes up the harmonious relationship, providing numerical-visual color information that is directly related to the visual resemblance of the parts to the master or controlled pattern, on a predefined scale. The information received will consist of the parts' color data (based on a CIELAB or other format) having been subjected to numerical-visual translation either by the method previously described in 1n) or by another method. This implies that the parts have a numerical value that ensures either proximity or remoteness with regards to a controlled pattern shared by the members of the harmonious relationship and which de facto implies a predetermined scale with numerical acceptance or rejection limits that ensure the visual aspect. In the case of the previously described method, these acceptance limits are between −2 and 2; a value of 3 is no longer visually acceptable.

2f) continuously comparing the numerical-visual color values of the interrelated parts of each harmonious relationship provided in stage 2e) in order to verify the status of each harmonious relationship and with it identify whether there are harmonious relationships close to the unacceptable levels of the predetermined numerical-visual scale through relative comparison and not just with regards to the master or controlled pattern, taking into account the numerical phase-shift indicator as indicator of the order in which the parts that make up a harmonious relationship will be compared, and obtaining a relative deviation between both numerical-visual color values, which also adjusts to the same numerical-visual tolerance scale that in a preferred embodiment is of −2 to 2. The integral relative deviation can be obtained by counting the number of "places" between both values on the −2 to 2 scale, thus, if the numerical-visual value of part A has a value of 1 and that of part B has a value of −1, the relative deviation is 2, so it is within the maximum acceptance limit. In turn, if part A has a numerical-visual value of 1.5 and part B has a value of −1; the relative deviation is 2.5, hence it is outside the relative tolerance. At the same time, if both parts are at 3, the relative deviation is zero, but both parts are far away from the controlled pattern, which is not desirable either. Moreover, the relative deviation may be obtained by means of intelligent algorithms when it is considered that these type of measurements exist for the different variables of the color measurement system used (such as CIELAB or other), and then there are relative deviations in L, a, b or others. By means of intelligent algorithms, a deviation index is generated that considers both, the relative deviation and the joint deviation with regards to the master, and integrates all the color variables (L, a, b, others) in order to identify the general status of the harmonious relationship.

It must ultimately be understood that the color harmonization method in manufactured articles of this invention is not limited to the embodiment previously described and that experts in the field will be trained, by the teachings established herein, to make changes to the color harmonization method in manufactured articles of this invention, whose scope will be established exclusively by the following claims.

The invention claimed is:

1. A computer automated method for generating numerical-visual color tolerances for parts manufactured by a manufacturing process that are required to be visually similar to a controlled color pattern, a visual reference value on a predetermined scale, or to the rest of the parts along with which they will be assembled into a whole product, comprising:

a) automatically generating an identification for each vehicle part to be manufactured;

b) for each of the identified vehicle parts, requesting information about the manufacturing elements and processes that are directly related to the end color result of the manufacturing process comprising: injection molds for injection processes, extrusion dies and rollers for extrusion processes;

c) automatically generating an approved manufacturing route which comprises defining the sequence or combination of color-affecting process and manufacturing equipment, and tools for the identified vehicle parts, and that will be used for manufacturing such parts;

d) requesting information about critical variables for the approved manufacturing process and manufacturing equipment and tools of each identified vehicle parts whose variation has an impact on the final color of the vehicle parts thus obtained and that will be approved by the client, comprising: production and operation conditions of the production equipment;

e) requesting information about the raw material used in the approved manufacturing route for the manufacturing of each identified vehicle part and its origin, and automatically adding said information to the approved manufacturing route in the database, wherein origin refers to the supplier or group of suppliers;

f) requesting information about a controlled pattern or plate or nominative reference based on a controlled catalog of the visual appearance of color desired by the client on the identified vehicle parts, as well as requesting the client's measurement specifications, specifically the zones of each identified vehicle part that require measurement and the measurement angles in each of these zones;

g) requesting information about tolerances for aspects of the raw materials in non-color related aspects comprising: ranges of viscosity and covering power of the paint;

h) generating for each identified vehicle part, a data field containing their production history comprising information comprising: description of the raw material that was applied to each identified vehicle part; information about the lot and container the raw material comes from; information about the staff that was responsible for the transfer of the raw material; information about the staff that was responsible for the supervision and operation of the production process; information about the operating conditions of the production process in the approved manufacturing route for each identified vehicle part; times at which each identified vehicle part was at each of the specific production stages of the approved manufacturing route; information regarding the color of each identified vehicle part comprising a numerical examination performed using technological equipment, such as an spectrophotometer, which under equal conditions of texture and substrate gives repeatable numerical readings in a standardized measurement system; information about visual examination of the color of each identified vehicle part, which is performed by a previously determined capable person or machine, and which comprise values in the same standardized measurement system, taking into account the controlled pattern or plate or nominative reference for a specific identified vehicle part, such predefined values being within a predefined range representative on the sense of the acceptance or deviation of the color with respect to said controlled pattern or plate or nominative reference;

i) automatically adding and relating the corresponding data field containing production history to the data of each identified vehicle part in the database;

j) carrying out a traceability method which automatically registers each step as of entry of the raw material into the warehouse up to its entry into the manufacturing equipment, according to the approved manufacturing route, with the added purpose of implementing a First-In, First-Out (FIFO) identified vehicle parts manufacturing process;

k) producing by means of the computer numerical-visual color tolerances for each part based on the numerical readings and visual examination of the color of each identified vehicle part, which comprise a range of numerical values that can be entered into technological equipment such as a spectrophotometer that ensure visual acceptance and that may be provided to suppliers of raw materials, in order to be applied to the approved manufacturing route for producing a identified vehicle part having a color within the numerical-visual tolerances;

l) producing by means of the computer tolerance values for the critical variables for the manufacturing process defined in step d) of the approved manufacturing route and the correlations between the manufacturing process variables and the final color result, such as to identify which color variables given in a standardized format for each identified vehicle part are controllable by means of changes to the critical variables for the manufacturing process, so that the necessary corrective actions can be taken when finding deviations in the color readings of the final identified vehicle parts;

m) automatically selecting and registering information corresponding to vehicle parts produced in accordance with the numerical-visual color tolerances obtained in step k) and with the tolerance values for the critical variables for the manufacturing process obtained in stage l), that resemble the controlled pattern or plate or nominative reference, as well as those identified vehicle parts that are visually acceptable to a client or to an expert;

n) automatically performing a visual examination of the parts identified in the previous stage (part-color numbers) and provide a numerical evaluation in a standardized format which is automatically converted to a numerical color specification based on a custom pre-programed standardized criteria based on the perception of the client who will accept the parts, which comprises an ideal numerical color specification in accordance with a predefined numerical pattern that represents the physical color that must be perceived by a person in order to obtain approval by such person, wherein the visual examination is performed by means of a colorimeter or other computer vision system;

o) automatically comparing the numerical color specification obtained in step n) corresponding to a part-color number with the predefined numerical pattern, and providing a numerical evaluation of color deviation resulting from the comparison and assigning the corresponding part-color number an approved status if the color deviation is within a predetermined pre-programed numerical range;

p) automatically adjusting the numerical-visual color tolerances in the database for a corresponding part-color number in accordance with the numerical evaluation in a standardized format corresponding to the part-color number approved in stage n);

q) automatically adjusting the tolerances of the approved manufacturing route and the correlations between the process conditions and the color end result in accordance with the numerical evaluation in a standardized format corresponding to the part-color number approved in stage n);

r) automatically adjusting tolerances of the critical variables for the approved manufacturing route and the correlations between the approved manufacturing route operating conditions and the color end result in accordance with the color values obtained from the identified part-color number approved in step n) and accordingly adjusting the numerical-visual color tolerances that must be specified to the suppliers of raw material.

2. A method for generating numerical-visual color tolerances in accordance with claim 1, wherein the traceability method if step j) comprises:

ja) upon reception, automatically validating that supplier information of raw material previously provided to the computer corresponds to the supplier previously registered for an approved manufacturing route of an identified vehicle part that use said raw material and in case the supplier does not correspond with that previously registered, said raw material will not be allowed and a new approved manufacturing route will be automatically generated prior to its entry;

jb) requesting color information of the raw material;

jc) automatically validating that the color information registered in the previous stage is within predetermined numerical-visual tolerances for color raw material in a standardized format and in case the color information is outside tolerances, automatically generate a raw material rejection message;

jd) automatically registering lot numbers as well as container numbers of specific shipments;

je) validating that the shipments are complete and that there are no missing items by comparing information of the shipment with actual information of the items in the shipment which must be previously provided to the computer;

jf) requesting information about production orders for each identified vehicle part to manufacture, which indicate the requirements of raw materials;

jg) requesting information about the raw materials leaving a warehouse and validating that the that the raw materials leaving the warehouse are the oldest from a container level and not just lot level and if the validation fails, generating an alarm; and validating that the correct raw material is used in the previously authorized manufacturing route and for which process and raw material tolerances have already been defined by comparing the information of the product with the information about the materials to be used in the authorized manufacturing routes and producing an alarm if the comparison fails;

jh) requesting information about the raw material entering into the manufacturing equipment, and registering said information in the database which will be used for generating the production history of the identified vehicle part thus produced;

ii) registering the lot number and container number of the raw material used in the approved manufacturing route for producing the identified vehicle part.

* * * * *